United States Patent [19]

Teller

[11] Patent Number: 4,581,210

[45] Date of Patent: Apr. 8, 1986

[54] METHOD FOR THE REMOVAL OF SULPHUR OXIDES FROM A FLUE GAS WITH A BAGHOUSE USED AS A SECONDARY REACTOR

[75] Inventor: Aaron J. Teller, Shrewsbury, Mass.

[73] Assignee: Teller Environmental Systems, Inc., Shrewsbury, Mass.

[21] Appl. No.: 669,952

[22] Filed: Nov. 9, 1984

[51] Int. Cl.$^4$ .......................... C01B 17/00; B01J 8/00
[52] U.S. Cl. ..................................... 423/242; 423/244
[58] Field of Search ............... 423/244 A, 244 R, 243, 423/242 R, 242 A

[56] References Cited

U.S. PATENT DOCUMENTS 4,197,278  4/1980  Gehri et al. .......................... 423/244
4,293,524  10/1981  Teller .................................. 422/169
4,319,890  3/1982  Teller ........................................ 55/1

FOREIGN PATENT DOCUMENTS 29564  6/1981  European Pat. Off. ............ 423/244

OTHER PUBLICATIONS

Karlsson et al, "Activated Wet-Dry Scrubbing of $SO_2$," Air Pollution Control Ass., vol. 33, No. 1, 1983.

Primary Examiner—Gregory A. Heller
Attorney, Agent, or Firm—Thompson, Birch, Gauthier & Samuels

[57] ABSTRACT

Sulfur oxides are removed from a flue gas stream with an upflow quench reactor, a dry venturi and a baghouse. The lime slurry used in the quench reactor is doped which enhances the neutralization reaction in the dry venturi and the bag filter. The use of the dry venturi allows a substantial buildup of solids on the filter wherein the baghouse functions as a fixed bed reactor.

8 Claims, 4 Drawing Figures

METHOD FOR THE REMOVAL OF SULPHUR OXIDES FROM A FLUE GAS WITH A BAGHOUSE USED AS A SECONDARY REACTOR

FIELD OF INVENTION

The invention relates to a process for the removal of sulfur oxides from flue gases.

BACKGROUND OF THE INVENTION

The prior art has recognized two distinct processes for the removal of sulfur oxides from gases: scrubbing with lime or neutralization with sodium alkalis. The use of a lime slurry for direct dry scrubbing in a quench reactor results in the vaporization of the slurry water and the formation of dry salt reaction products. The effluent stream leaving the quench reactor contains the reaction products (salts of acid gases), unreacted reagent, particulates and unreacted gases. This scrubbing is typically conducted at low stack temperatures. The efficiency of lime slurry neutralization utilizing economic levels of reagent is relatively low, typically on the order of 70 to 80% $SO_x$ capture and neutralization. It has been determined that on an experimental basis the capture and neutralization of $SO_x$ can be increased when a limestone slurry is 'doped' with an alkali salt (see *Air Pollution Control Association*, January 1983, Vol. 33, No. 1, "Activated Wet-Dry Scrubbing of $SO_2$", Karlsson et al). The neutralization reaction continues after the effluent gas leaves the quench reactor.

The efficiency of $SO_x$ capture and neutralization by sodium alkalis, is somewhat higher than that achieved with lime slurry, typically on the order of 85 to 95%. However, when using sodium alkalis, the products are water-soluble salts which present a major disposal problem.

In these prior art processes a baghouse is commonly employed to remove the dry products formed in the quench reactor. The dry products are retained as filter cake and the filtered gases are discharged to the atmosphere. The filters are periodically cleaned by shaking, reverse air flow or by pulsed air jets. The adhesive-like characteristics of the dry product (non free flowing) necessitates that the filters be cleaned frequently, and if this is not done, the dry products blind the filter fabric, causing an unacceptably high pressure drop across the baghouse.

The present invention stems from the discovery that the efficiency of $SO_x$ removal in a lime slurry neutralization process can be increased to over 90% by the interposition of a dry venturi between the quench reactor and the baghouse without resorting to a reduction of temperature close to the dew point. The calcium based reagent used in the quench reactor is doped. The dry venturi allows the filter cake in the baghouse to be accumulated to a sufficient depth such that the baghouse functions as a secondary (fixed bed) reactor.

The filter cake contains unreacted reagent due to the normal excess reagent fed to the system. This unreacted reagent neutralizes the residual acid gases flowing through the baghouse.

The filter cake (dry reaction products) accumulated in the baghouse is substantially non-tacky. Thus, the cake buildup in the baghouse may be severalfold over that which can be tolerated in prior art processes. This in turn makes it possible to extend the duration between cleaning cycles to as much as 50 times that of conventional processes. This increase in cycle time permits the accumulation of a fixed bed cake in the baghouse.

Broadly, the invention comprises a method for the removal of sulfur oxides from a gaseous stream with greater efficiencies than conventional processes. The method avoids the necessity for dangerous conditions of operating a baghouse at a temperature close to the dew point. The gaseous stream containing sulfur oxides is introduced into a quench reactor and is contacted with a calcium-based reagent containing between about 3 to 30% by weight of a hygroscopic alkaline metal cation salt, based on the total weight percent of the calcium compound in the reagent. Such salts include $CaCl_2$, $MgCl_2$, $FeCl_3$, $MnCl_2$, $ZnCl_2$, $CrCl_2$, $CdCl_2$, $FeO_2$. The effluent stream from the reactor contains particulates, salts of acid gases containing unreacted reagent, and residual acid gases. The effluent stream flows through a dry venturi. A separate stream containing sorptive material and/or fly ash from the baghouse product stream is introduced into the dry venturi to contact the effluent stream to remove submicron particulates therefrom. The effluent stream from the dry venturi flows into a separator where the solids in the stream are collected and form a filter cake. The acid gases in the stream have interfacial contact with the cake and a substantial portion of the $SO_x$ entering the separator is neutralized. The total $SO_x$ removed from the gaseous stream is at least 90%.

DESCRIPTION OF THE PREFERRED EMBODIMENT

The process of the present invention results in a capture and neutralization efficiency of $SO_x$ removal from a flue gas stream of at least 90% and generally greater than 95%. This capture and neutralization efficiency can be achieved at a doped calcium reagent feed rate on the order of one to three times the stoichiometric amount based on the inlet gas content of hydrochloric acid and sulfur oxides. The reaction of the $SO_x$ occurs sequentially in a quench reactor, in a dry venturi and in a separator which preferably comprises a baghouse. The dry reaction products are accummulated in the baghouse to form a filter cake which functions as a fixed bed reactor.

Figure 1:
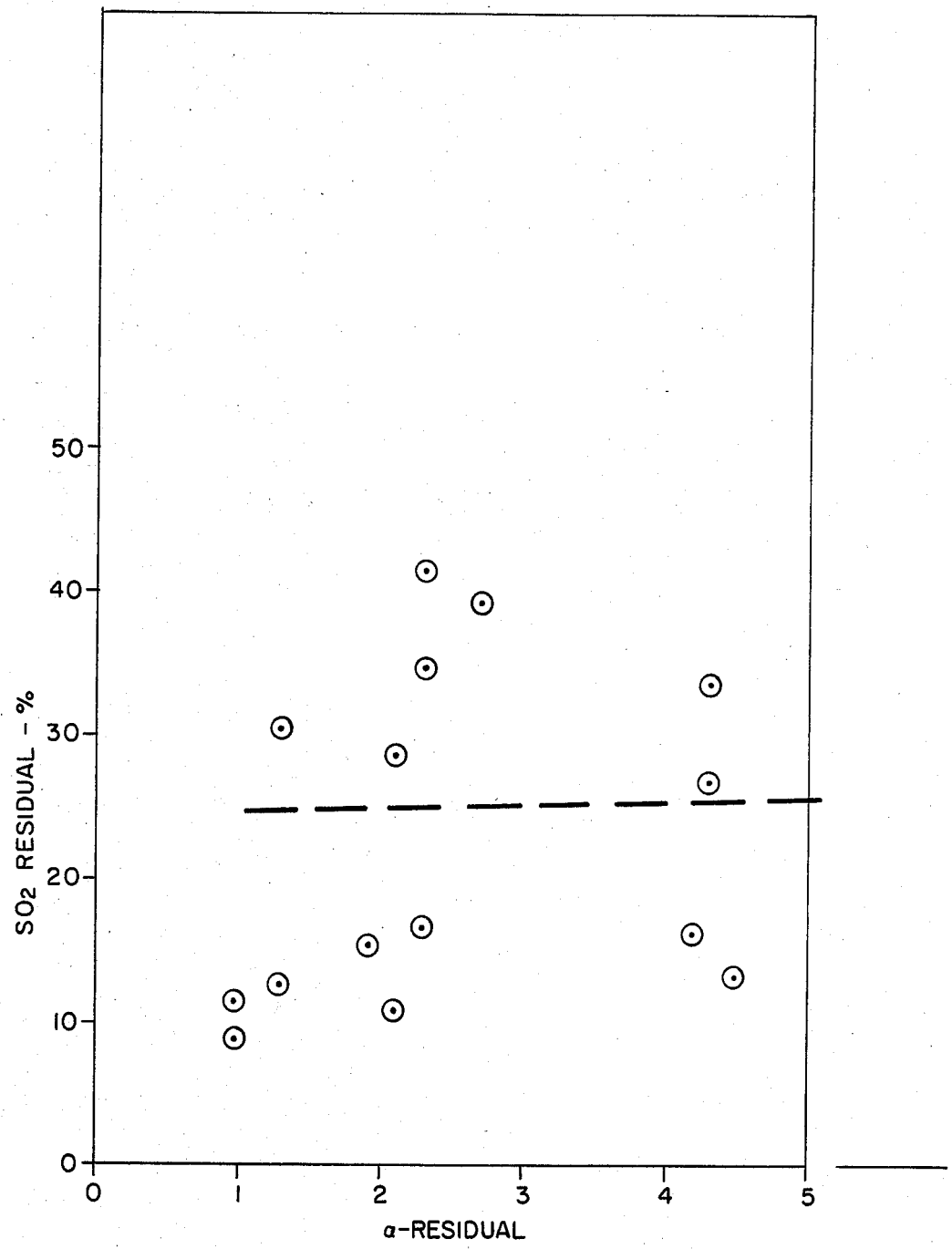
FIGS. 1, 2 and 3 are graphs of neutralization efficiencies.
Figure 2:
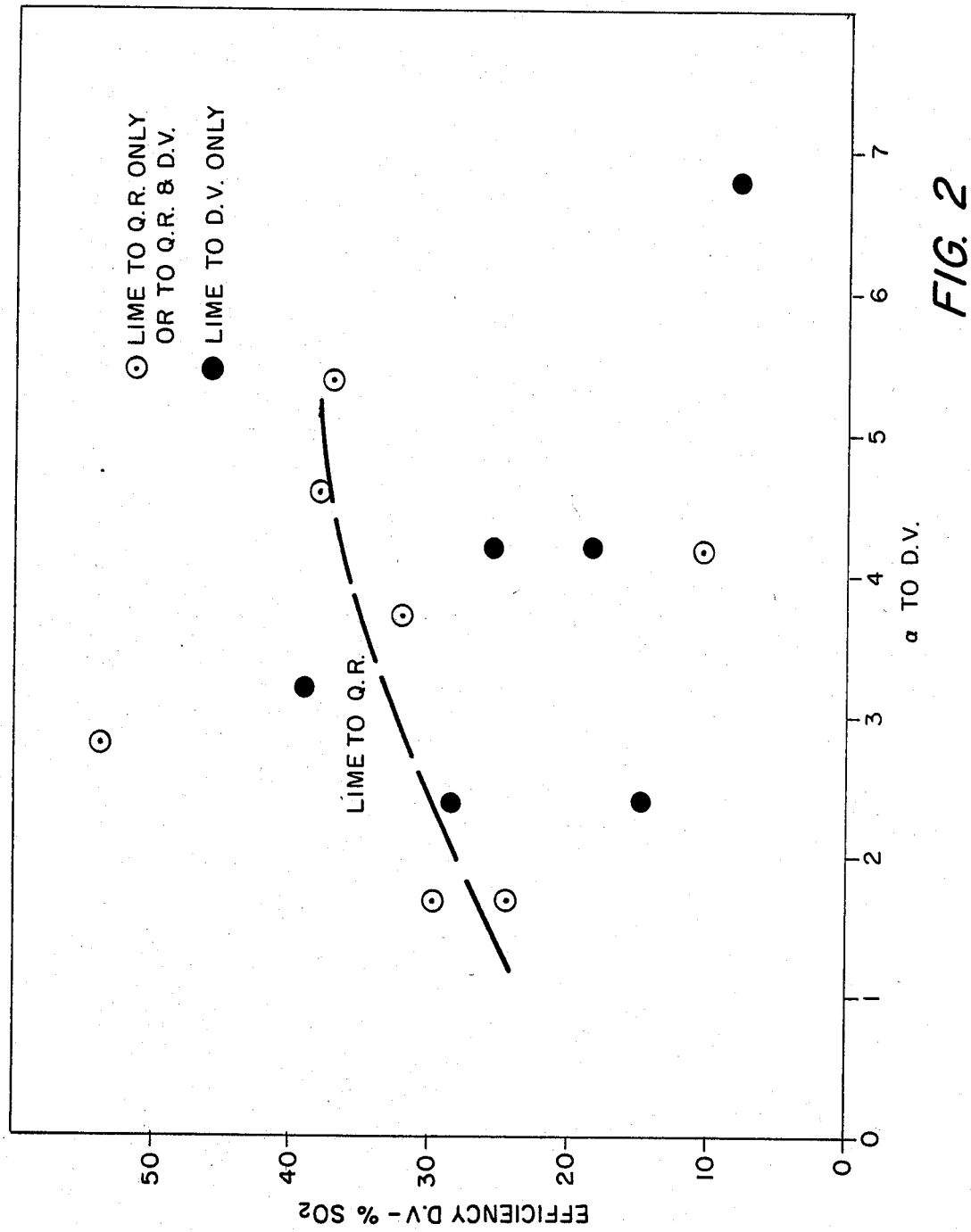
Figure 3:
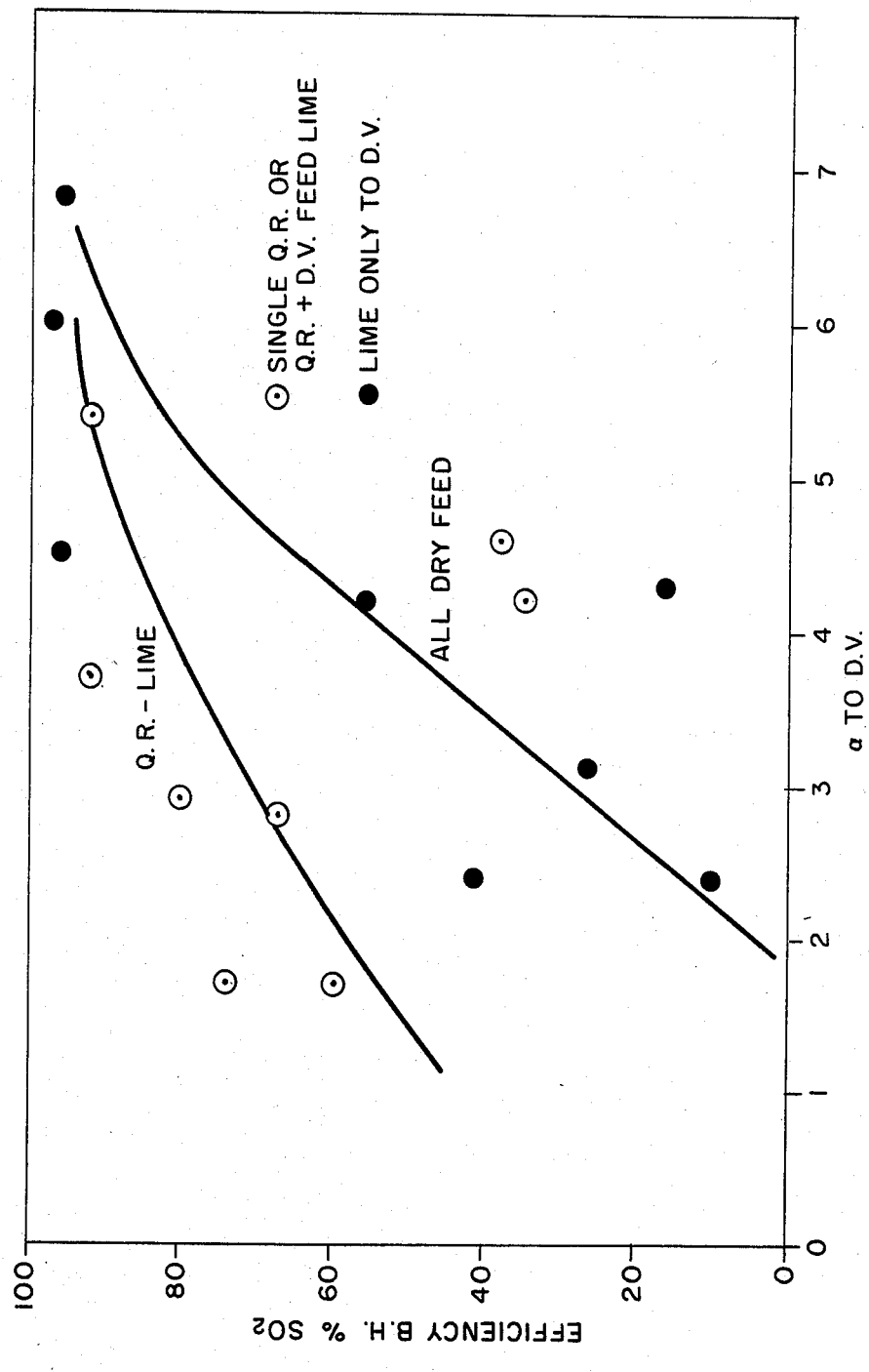
Figure 4:
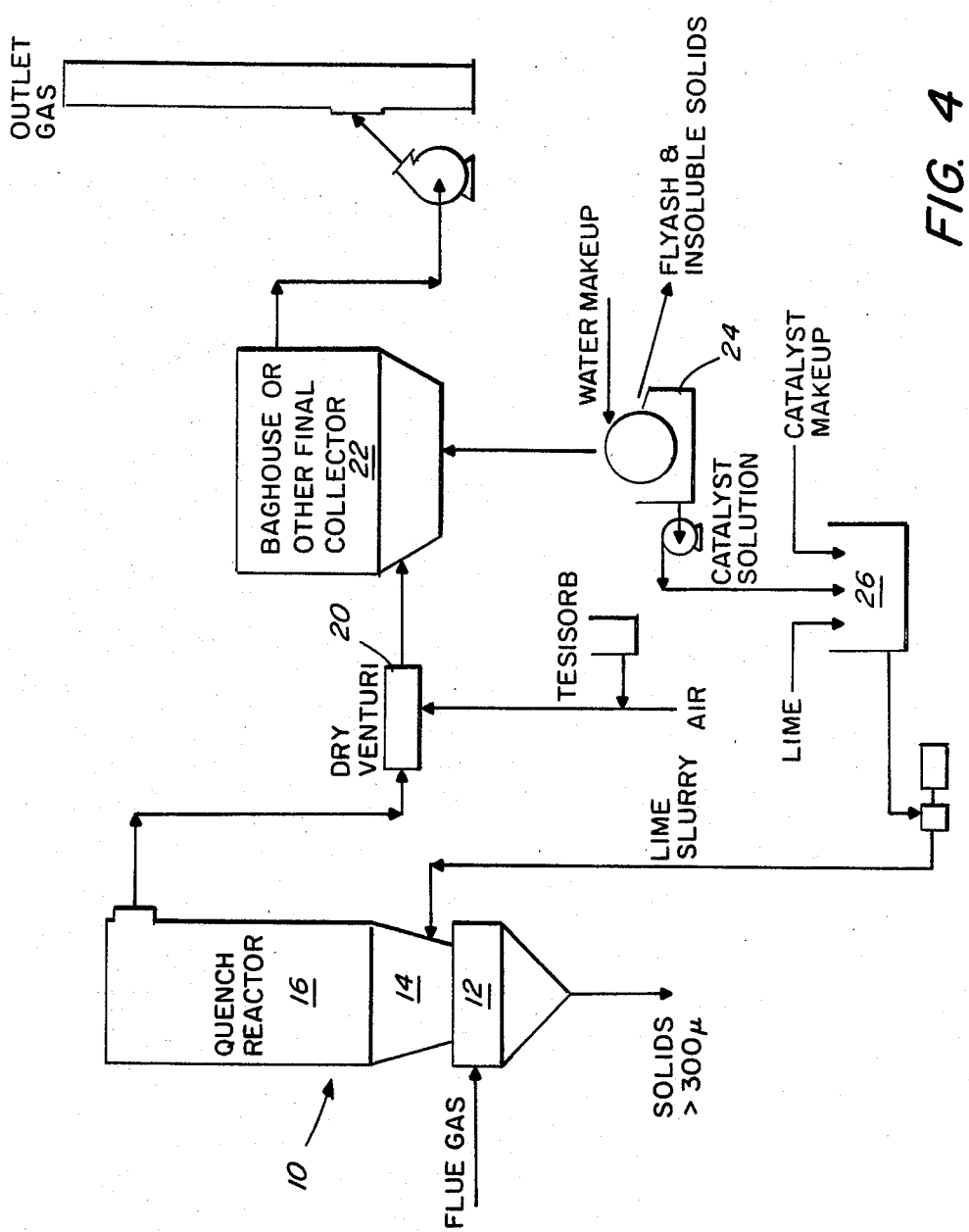
FIG. 4 is a process flow diagram of a system embodying the invention.

The effect of the interpositioning of the dry venturi coupled with the baghouse, now with an extended capture cycle prior to cleaning is indicated in FIGS. 1, 2, and 3.

Where a conventional baghouse configuration is employed after a spray drier, the efficiency of the baghouse is nonreproducible with efficiencies ranging from 9% to 41.5% (FIG. 1). The statistical average efficiency is of the order of 25% with little or no variation as a function of the residual $\alpha$ (the ratio of unreacted lime to the quantity of $SO_2$ after the spray drier). Thus, in order to achieve an overall efficiency of 75%, the spray drier efficiency must be a minimum of 67% based on the statistical average efficiency of the baghouse. However, based on the wide variation in baghouse efficiency for reaction with $SO_2$, resulting from the short residence time of the cake, for the objective of safety, the spray drier should have an efficiency, continuously, of 70% or greater.

With no prereaction at a low $\alpha$, the dry venturi provides an $SO_2$ recovery of about 20% (FIG. 2). With prereaction, in the range of residual $\alpha=2$, (about 50% Reactor efficiency), the dry venturi provides an efficiency of 28% and the baghouse, an efficiency of 56% (FIG. 3). Without prereaction, the baghouse provides an efficiency of about 20%.

Based on an initial feed of lime equivalent to $\alpha=1.4$, the system efficiencies are compared.

| Reactor Efficiency | System Efficiency | | |
|---|---|---|---|
| | Conventional | Proposed System | |
| | | No Prereaction | Prereaction |
| 40 | 50 | 63 | 79 |
| 60 | 70 | 73 | 88 |
| 80 | 85 | 90 | 96 |

Therefore, with the combination of the dry venturi and baghouse, an improvement of efficiency ranging from 6% to 15% is achieved over the conventional approach, and combined with prereaction, the improvement ranges from 13% to 44%.

Most importantly, any reduction in efficiency of the reactor is overcome by the secondary reactions provided by the proposed system, thus providing for improved reliability in fulfilling environmental objectives.

A typical example of an operation in accordance with the present invention will now be described with reference to the accompanying drawing. A flue gas having a content of 1500 PPM $SO_2$ is introduced into a quench reactor 10 at a temperature of between about 148° to 235° C. and at a flow rate of 150,000 ACFM at 204° C. The quench reactor 10 comprises a pretreatment zone 12, a throat 14 and a reaction chamber 16. This quench reactor is disclosed in U.S. Pat. No. 4,293,524 which patent is incorporated by reference in its entirety in this disclosure. The flue gas flows tangentially into the pretreatment zone 12 which has a cone-shaped inner surface. The larger particulates in the stream are removed by centrifugal force and then dropped from the zone 12. The flue gas passes through the throat 14 and into the reaction chamber 16 where it is contacted with a lime slurry. The lime slurry has a composition of 2000 PPH $Ca(OH)_2$ in 36 GPM water and is doped with $CaCl_2$ in an amount of 20% weight based on the weight of CaO in the slurry. The amount of slurry and rate of introduction is such that 65 to 80% of the $SO_x$ is neutralized. The reaction products are entrained in the effluent stream, which stream has a composition of 300–500 PPM $SO_2$ and the stream is discharged from the reactor 10 at a temperature of between 98° to 105° C.

The effluent stream from the reactor 10 flows to a dry venturi 20 such as disclosed in U.S. Pat. No. 4,319,890 which patent also is incorporated by reference in its entirety in this disclosure.

In the dry venturi 20 submicron particulates (including sulfuric acid) are collected on limestone (or equivalent) targets introduced from a source 22. Equivalent targets include alkaline bypass waste from Portland cement manufacture, crystalline phonolites or syenites, recycled fly ash, or other similar crystalline materials.

The effluent stream from the venturi then proceeds to a conventional baghouse 24 such as a reverse air bag filter, for example available from American Air Filter or Research Cotterell. This stream having a composition of 200–350 PPM $SO_2$ enters the baghouse 24 at a temperature of between 95° to 105° C. The solid product from the baghouse 22 is transported to a filter 24, such as a rotary filter, where water equivalent to the system quench reactor requirement(s) is added to dissolve the calcium chloride or equivalent salt in the fly ash. The insoluble calcium product is discharged as a cake.

The filtrate or solution is transported from the filter 24 to a hydrated lime mixing tank 26 for recycle into the system.

In the process, substantially increased residence time of the solids in the baghouse (or similar collector) is achieved. It has been found where conventional cleaning cycles for a shaker or reverse air baghouse range from 5 to 30 minutes, the dry venturi action prior to the baghouse increases this cycle time from 4 to 8 hours. Where the conventional pulse jet cleaning cycle is normally 1 to 4 minutes, the dry venturi action prior to the baghouse, increases the cycle time to 30 minutes to 2 hours.

This increase in the cycle time permits the accumulation of a fixed bed cake on the bags (or other substrate) with no increase in the pressure drop in the baghouse. The cake contains unreacted reagent due to the normal excess reagent fed to the system.

With the prior art normal cycle times only 3–9% of the total $SO_2$ entering the baghouse is removed from the gas by the baghouse cake (see *Combustion*, page 14, February 1981). That is, the prior art baghouse cake $SO_x$ removal efficiency ranges from 13 to 30% for the $SO_2$ entering the baghouse with no increase in efficiency with recycle of the baghouse product.

With the use of the dry venturi-baghouse combination permitting the residence time in the baghouse to exceed three hours, the efficiency of $SO_x$ removal, for the dry venturi and baghouse including the calcium chloride doping, ranged from 45 to 100% for eight tests conducted with an average $SO_x$ removal efficiency of 80.8% from the inlet of the dry venturi to the outlet from the baghouse. More specifically with fly ash at 2 GR/DSCF and reagent having a composition set forth above and inlet $SO_2$ in the range of 1500 PPM the following results were obtained.

| | Cleaning Cycle Minutes | Thickness of Cake, mm |
|---|---|---|
| Conventional-Baghouse | 5 | 0.086 |
| (Prior Art) | 30 | 0.515 |
| Teller System | 240 | 4.1 |
| | 480 | 8.2 |

The conventional baghouse cake thickness, between 0.1 and 0.5 mm is too low to provide effective fixed bed reaction capability and will also, because of uneven deposition, have low spots where the gas will pass through uneffected by the cake. The present inventive system even with uneven cake provides for effective reaction.

What is claimed is:

1. A method for removing sulfur oxides from a flue gas which includes:
   (a) introducing the flue gas containing sulfur oxides and particulates into a reactor;
   (b) contacting the flue gas with a calcium-based reagent to effect a neutralization reaction, thereby forming reaction products, the calcium-based reagent containing between 3–30% by weight of an alkaline metal cation salt based on the calcium compound in the reagent;

(c) entraining the reaction products of the neutralization reaction and the particulates as solid in the effluent stream discharged from the quench reactor;

(d) contacting the effluent stream with a gaseous stream having target particulates dispersed therein to promote inertial impaction between said entrained solids and the target particulates whereby the submicron solids entrained in the effluent stream are captured by the target particulates;

(e) flowing the effluent stream into a collection zone;

(f) accumulating the solids on a filter to form a bed of substantially non-tacky solids, some of said solids containing unreacted reagent; and (g) increasing the depth of the solids on said filter to provide at least a 40% removal of the sulfur oxides flowing into the collection zone.

2. The method of claim 1 wherein the $SO_x$ removed from the flue gas is greater than 90%.

3. The method of claim 1 wherein the calcium based reagent is $Ca(OH)_2$ and the alkaline metal cation salt is $CaCl_2$.

4. The method of claim 1 which includes flowing the gaseous stream through a chamber in an upwardly moving direction to effect separation of larger moving particles from the gaseous stream;

transferring the gaseous stream from the first chamber into a second chamber; and introducing the calcium based reagent in a direction cocurrent with the upwardly moving stream to evaporate substantially all the basic material to form a dry stream with entrained acid salts and suspended particulates.

5. The method of claim 1 wherein the target particulates have an average particle size of between 3–50 microns.

6. The method of claim 5 wherein the target particulates are selected from the group consisting essentially of limestone, alkaline bypass waste from Portland Cement Manufacture, crystalline phonolites or syenites, recycled fly ash or other similar crystalline materials.

7. The method of claim 6 wherein the target particulates are limestone.

8. The method of claim 1 which includes removing the accumulated solids from the filter;

dissolving the alkaline metal cation salt and discharging the insoluble calcium product as a cake.

* * * * *